(12) United States Patent
Miyachi et al.

(10) Patent No.: US 9,178,454 B2
(45) Date of Patent: Nov. 3, 2015

(54) APPARATUS FOR CONTROLLING ROTATING MACHINE BASED ON OUTPUT SIGNAL OF RESOLVER

(71) Applicant: DENSO CORPORATION, Kariya, Aichi-pref. (JP)

(72) Inventors: Jyunji Miyachi, Anjo (JP); Tsuneo Maebara, Nagoya (JP)

(73) Assignee: DENSO CORPORATION, Kariya (JP)

( * ) Notice: Subject to any disclaimer, the term of this patent is extended or adjusted under 35 U.S.C. 154(b) by 9 days.

(21) Appl. No.: 14/293,226

(22) Filed: Jun. 2, 2014

(65) Prior Publication Data
US 2014/0361720 A1    Dec. 11, 2014

(30) Foreign Application Priority Data
Jun. 5, 2013 (JP) ................................. 2013-118912

(51) Int. Cl.
*H02P 6/16* (2006.01)
*H02P 29/00* (2006.01)

(52) U.S. Cl.
CPC .............. *H02P 6/16* (2013.01); *H02P 29/0038* (2013.01)

(58) Field of Classification Search
CPC ........................................................ H02P 6/16
USPC ............. 318/400.39, 400.38, 400.37, 400.01, 318/700
See application file for complete search history.

(56) References Cited

U.S. PATENT DOCUMENTS

| 7,952,309 B2 * | 5/2011 | Nishimura et al. ...... 318/400.24 |
| 2003/0106738 A1 | 6/2003 | Yoneda et al. |
| 2009/0195197 A1 | 8/2009 | Nishimura et al. |
| 2010/0007294 A1 | 1/2010 | Hasegawa et al. |

FOREIGN PATENT DOCUMENTS

| JP | H06-078558 | 3/1994 |
| JP | 2003-231476 | 8/2003 |
| JP | 2007-318948 | 12/2007 |
| JP | 2008-256486 | 10/2008 |
| JP | 2009-077481 | 4/2009 |
| JP | 2009-183092 | 8/2009 |
| JP | 5148394 | 12/2012 |

OTHER PUBLICATIONS

Office Action (2 pages) dated May 26, 2015, issued in corresponding Japanese Application No. 2013-118912 and English translation (3 pages).

* cited by examiner

*Primary Examiner* — David S Luo
(74) *Attorney, Agent, or Firm* — Nixon & Vanderhye P.C.

(57) ABSTRACT

A control apparatus controlling a rotating machine includes a signal output unit that outputs an excitation signal to a resolver used for detecting a rotational angle of the rotating machine; a demodulation unit that demodulate a signal related to the rotational angle based on a detection of a modulated signal and the excitation signal so as to output a demodulated signal; a filter that eliminates higher harmonics in the demodulated signal outputted by the demodulation unit so as to output a calculated angle of the rotational angle; and an operating unit that controls a switching element included in a DC-AC conversion circuit to be ON and OFF based on the calculated angle of the rotational angle outputted by the filter, so as to control the rotating machine with an output voltage of the DC-AC conversion circuit supplied to the rotating machine.

22 Claims, 13 Drawing Sheets

Nm=1000rpm, Trq*=0Nm

Nm=1000rpm, Trq*=Tmax (t1~t5: CHANGE TIMING OF fref)

APPARATUS FOR CONTROLLING ROTATING MACHINE BASED ON OUTPUT SIGNAL OF RESOLVER

CROSS REFERENCE TO RELATED APPLICATION

This application is based on and claims the benefit of priority from earlier Japanese Patent Application No. 2013-118912 filed on Jun. 5, 2013 the description of which is incorporated herein by reference.

BACKGROUND 1. (Technical Field)

The present disclosure relates to an apparatus for controlling a rotating machine based on an output signal of a resolver.

2. (Description of the Related Art)

Conventionally, a motor control system provided with a resolver and a resolver digital converter (hereinafter is referred to RD converter) is known. In the motor control system, a control apparatus controls a rotating machine based on the output signal of the resolver. Specifically, the control apparatus controls, based on the output signal of the resolver, a switching element included in the DC (direct current)-AC (alternating current) conversion circuit which is electrically connected to the rotating machine. For example, a Japanese Patent No. 5148394 discloses a motor control system provided with a resolver that generates a modulated wave in which an excitation signal is modulated by an amplitude-modulation based on the rotational angle of the motor, and a RD converter that calculates/outputs a calculated value of the rotational angle based on the detection of the generated modulated wave and the excitation signal.

In developing the motor control system, the inventors faced a problem that an accuracy of calculating the rotational angle outputted by the RD converter decreases when controlling the switching element in the DC-AC conversion circuit connected to the rotating machine to be ON and OFF thereby increasing the current flowing into the rotating machine. Therefore, there is a concern that the controllability of the rotating machine is decreased when the calculation accuracy of the rotational angle decreases.

SUMMARY

The embodiment provides a control apparatus in which the calculation accuracy of the rotational angle of a rotating machine can be prevented from being decreased.

As an first aspect of the embodiment, the control apparatus includes a signal output unit that outputs an excitation signal to a resolver used for detecting a rotational angle of the rotating machine; a demodulation unit that demodulates a signal related to the rotational angle based on a detection of a modulated signal where the excitation signal is amplitude-modulated in response to the rotational angle of the rotating machine and the excitation signal, and outputs a demodulated signal; a filter that eliminates higher harmonics in the demodulated signal outputted by the demodulation unit so as to output a calculated angle of the rotational angle; and an operating unit that controls a switching element included in a DC-AC conversion circuit to be ON and OFF based on the calculated angle of the rotational angle outputted by the filter, so as to control the rotating machine with an output voltage of the DC-AC conversion circuit supplied thereto.

With the configuration as described above, the control apparatus of the present application includes a setting unit. The setting unit features that an object frequency is set to be variable so as to have an error frequency, determined by a difference between a frequency of a variable component in the current flowing through the rotating machine and an frequency of the excitation signal, to be within the cutoff region of the filter. Especially, the object frequency is at least either an excitation frequency of the excitation signal or a switching frequency of the switching element.

As a second aspect of the embodiment, the frequency of the excitation signal and the switching frequency of the switching element are set such that an error frequency which is determined by a difference between a frequency of a variable component in the current flowing through the rotating machine and an frequency of the excitation signal, is within the cutoff region of the filter.

When the current flowing through the rotating machine becomes larger due to ON-OFF operation of the switching element, switching noise (electromagnetic waves) occurring due to the current flowing increases and mixes with the excitation signal or the modulated waves. As a result, since the switching noise is mixed to the demodulation signal, an error occurs between the calculated value of the rotational angle outputted by the filter and the real rotational angle. In this respect, the inventors have found that the frequency of the noise mixing to the excitation signal or the modulated wave is identical to an error frequency which is determined as a difference between a frequency of a variable component in the current flowing through the rotating machine caused by the ON-OFF operation of the switching element and an frequency of the excitation signal.

Therefore, according to the first aspect of the embodiment and the second aspect of the embodiment, the frequency of the excitation signal and the switching frequency are set so as to have the error frequency to be within the cutoff region of the filter. Hence, even when noise is mixed to the excitation signal and the modulated wave so that noise is mixed to the demodulation signal, the filter can suppress influence of noise on the calculation accuracy of the rotational angle. As a result, the calculation accuracy of the rotational angle can be avoided from degrading and also, degrading controllability of the rotating machine can be avoided.

DETAILED DESCRIPTION OF THE PREFERRED EMBODIMENTS

First Embodiment

With reference to the drawings, the first embodiment in which a control apparatus applied to a vehicle provided with a rotating machine as on-board main equipment (e.g., traction motor) is described as follows.

Figure 1:
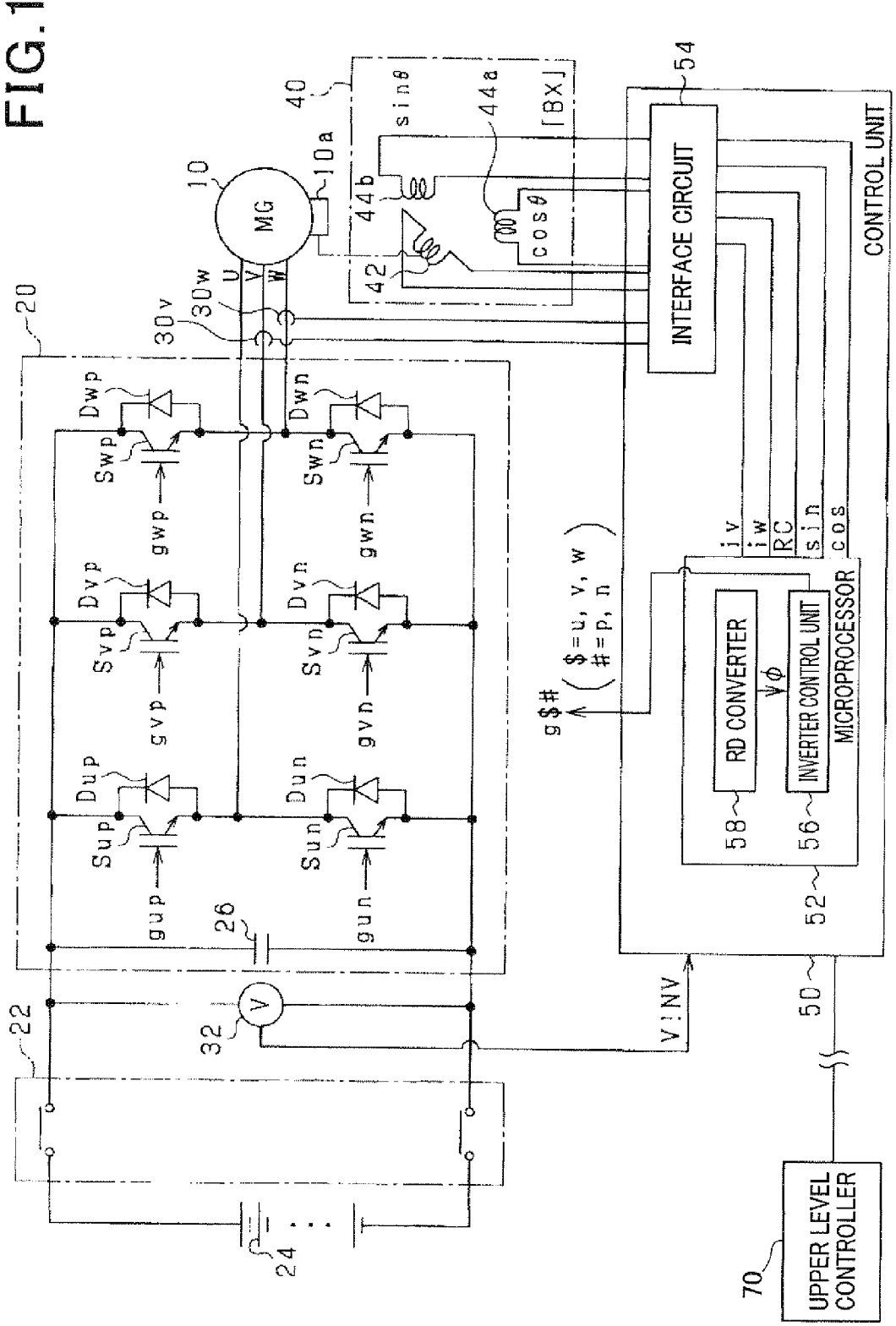
FIG. 1 is an overall configuration of a motor control system according to the first embodiment of the present application.

FIG. 1 is an overall configuration of a motor control system 1. As shown in FIG. 1, the motor generator 10 is a three-phase motor generator serving as on-board main equipment which is mechanically connected to a drive wheel (not shown) of the vehicle. According to the first embodiment, a permanent magnet synchronous motor is used for the motor generator 10 (i.e., interior permanent magnet synchronous motor: IPMSM).

The motor generator 10 is electrically connected to the high voltage battery 24 via an inverter 20 as a DC-AC conversion circuit and a main relay 22. The high voltage battery 24 is a rechargeable battery having a terminal voltage exceeding 100 volts (e.g., 288 volts). For example, a lithium-ion battery or a nickel-metal hydride battery can be used.

The inverter 20 drives the motor generator 10. The inverter 20 includes a high-side (upper arm side) switching element S\$p (\$=u, v, w) and a low-side (low arm side) switching element S\$n which constitute a series-connected circuit. Specifically, the inverter 20 includes 3 pairs of switching elements S\$p, S\$n of series-connected circuits. The connection points between the switching elements S\$p and S\$n is connected to phase \$ of the motor generator 10. For the switching element S\$# (#=p, n), a voltage controlled semiconductor switching element, for example, an Insulated Gate Bipolar Transistor (IGBT) is used. A free wheel diode D\$# is connected in reverse to the switching element S\$#. A smoothing capacitor 26 that smoothes the input voltage of the inverter 20 is connected between a main relay 22 and the input side of the inverter 20. The inverter 20 outputs output voltages corresponding to u, v and w phases of the motor generator 10 to control/drive the motor generator 10.

In the motor control system 1, a V-phase current sensor 30v that detects current flowing through the V-phase of the motor generator 10, a W-phase current sensor 30w that detects current flowing through the W-phase of the motor generator 10 and a voltage sensor 32 that detects the input voltage of the inverter 20.

Moreover, the motor control system 1 is provided with a resolver 40 that detects a rotational angle (electrical angle θ) of the motor generator 10. The resolver 40 includes a primary coil 42 and a pair of secondary coils 44a and 44b. Specifically, the primary coil 42 is coupled to the rotor 10a of the motor generator 10. The primary coil 42 is excited by an excitation signal Sc which is a sine wave (AC signal) and the magnetic flux induced at the primary coil 42 interlinks a pair of secondary coils 44a and 44b. At this time, since the relationship between the positions between the primary coil 42 and the secondary coil 44a and 44b periodically changes depending on the rotational angle of the rotor 10a, the number of magnetic flux interlinking the secondary coils 44a and 44b periodically changes. According to the first embodiment, the pair of secondary coils 44a and 44b and the primary coil 42 are arranged such that the phases of voltages generated at the respective secondary coils 44a and 44b are shifted from each other by n/2. Thereby, the output voltage of the secondary coils 44a and 44b become modulated waves modulated from the excitation signal Sc by using the modulation wave sin θ and cos θ (i.e., amplitude modulation). Specifically, the respective modulated waves are sin θ·sin Ωt and cos θ·sin Ωt, where the excitation signal Sc is sin Ωt.

According to the first embodiment, the number of poles of the motor generator 10 is 8 so that the axial double angle which is 8 is used for the resolver 40. Therefore, the rotational angle (mechanical angle θ m) of the rotor 10a of the motor generator 10 is calculated such that a calculated angle φ outputted by the resolver digital converter as described later (referred to RD converter 58) is divided by the axial double angle to calculate the rotational angle.

The above-described sensors detect various detection values which will be acquired by a control unit 50 that constitutes a low voltage system. The control unit 50 is provided with a microprocessor 52 including CPU, ROM and RAM and an interface circuit 54. The microprocessor 52 receives output signals from the V-phase current sensor 30v, the W-phase current sensor 30w and the resolver 40. The microprocessor 52 includes an inverter control unit 56, a RD converter 58. It is noted that the inverter control unit 56 corresponds to the operating unit including the PWM operating unit and the over modulation operating unit.

Next, with reference to FIG. 2, a control process for a controlled variable of the motor generator 10 is described as follows. The control process is executed by the inverter control unit 56. It is noted that the controlled variable is defined as a torque according to the first embodiment.

The motor control generator 10 is controlled by operating the switching element S\$# such that a command current corresponding to a torque command Trq* and the current flowing through the motor generator 10 are identical. That is, according to the first embodiment, the output torque of the motor generator 10 should be final controlled variable. However, a current flowing to the motor generator 10 is used as a controlled variable to control the output torque, thereby controlling the current flowing to the motor generator 10 to be the command current. Especially, in the first embodiment, current vector control is performed so as to control the current flowing to the motor generator 10 to be the command current.

Specifically, a two phase converter 56a converts U-phase current iu, V-phase current iv, W-phase current iw into d axis current idr, q axis current iqr which are current with respect to the rotating coordinate, based on a detection value iv of the V-phase current sensor 30v, a detection value iw of the W-phase current sensor 30w and a calculated value of the electrical angle θ (hereinafter referred to calculated angle φ outputted by the RD converter 58. Regarding the U-phase current iu, based on Kirchhoff's law, the current value can be calculated from the detection value iv of the V-phase current sensor 30v and a detection value iw of the W-phase current sensor 30w.

The command current calculation unit 56b calculates, based on the torque command Trq*, d axis command current id* and q axis command current iq* which are command values of the current with respect to the rotating coordinate. The torque command Trq* is transmitted from a control apparatus (i.e., upper level controller 70) having a priority higher than that of the control unit 50.

Figure 2:
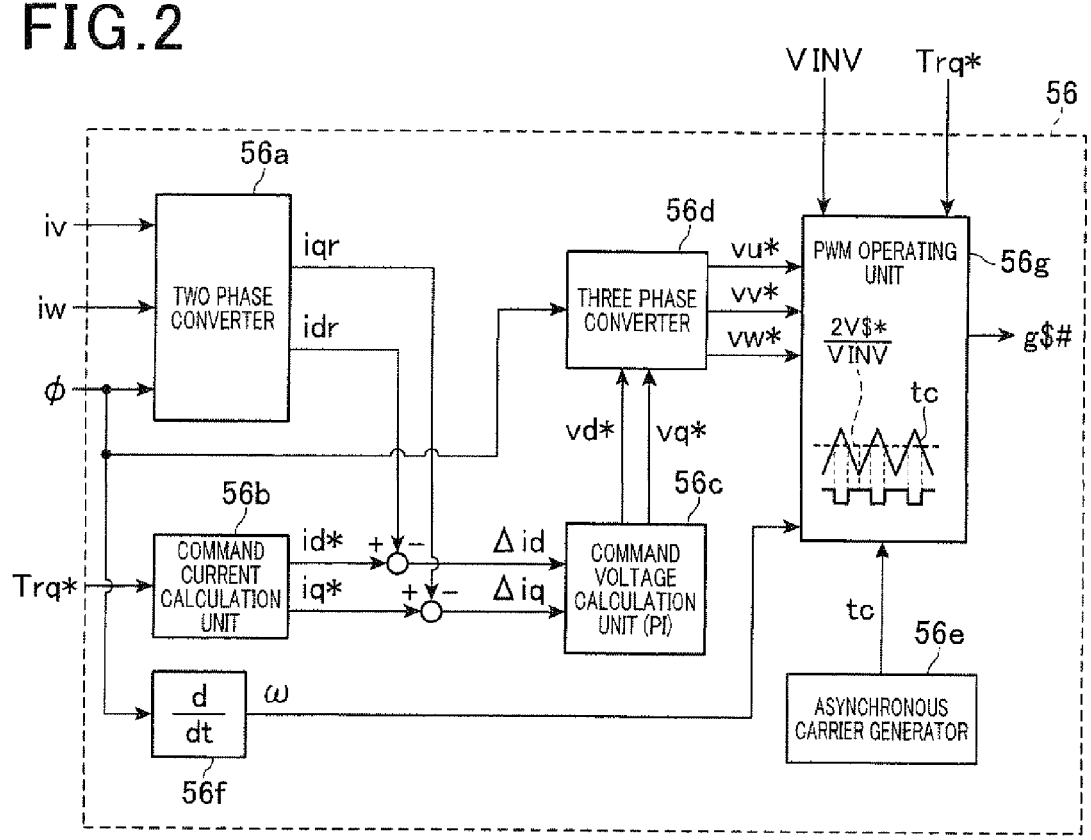
FIG. 2 is a block diagram showing a control process of the motor generator according to the first embodiment.

As shown in FIG. 2, a command voltage calculation unit 56c calculates, as a control input, q axis command voltages vd* and vq* used for a feedback control. The feedback control is applied to the d axis command current id* and q axis command current iq* with the d axis current idr and the q axis current iqr. Specifically, a proportional-integral control based on a deviation between the d axis current idr and the d axis command current id* is performed and a proportional-integral control based on a deviation between the q axis current iqr and the q axis command current iq* is performed, thereby calculating q axis command voltage vq*.

A three phase converter 56d converts, based on the calculated angle φ outputted by the RD converter 58, the d axis command voltage vd* and the q axis command voltage vq* to be a three phase voltage v$* ($=u, v, w) with respect to the fixed coordinate. These command voltages v$* are used for a control input to perform a feedback control in which the d axis current idr and the q axis current iqr are feedbacked to the command current id* and iq*. It is noted that these command voltage v$* is sine wave.

An asynchronous carrier generator 56e generates and outputs a carrier signal tc having fixed period. A triangle wave is used for the carrier signal tc according to the first embodiment.

A speed calculation unit 56f calculates a calculated angular velocity ω which is a differential value of the calculated angle φ.

A PWM operating unit 56g generates an operation signal g$# to control the three phase output voltage of the inverter 20 to be a voltage where the command voltage v$* (sine wave) is simulated. According to the first embodiment, the PWM operating unit 56g generates an operation signal g$# by a PWM processing in which a value "2·v$*/VINV" is compared with the carrier signal tc generated by the asynchronous carrier generator 56e. It is noted that the value "2·v$*/VINV" is a normalized value of the command voltage v$* with respect to the input voltage VINV of the inverter 20.

Figure 3:
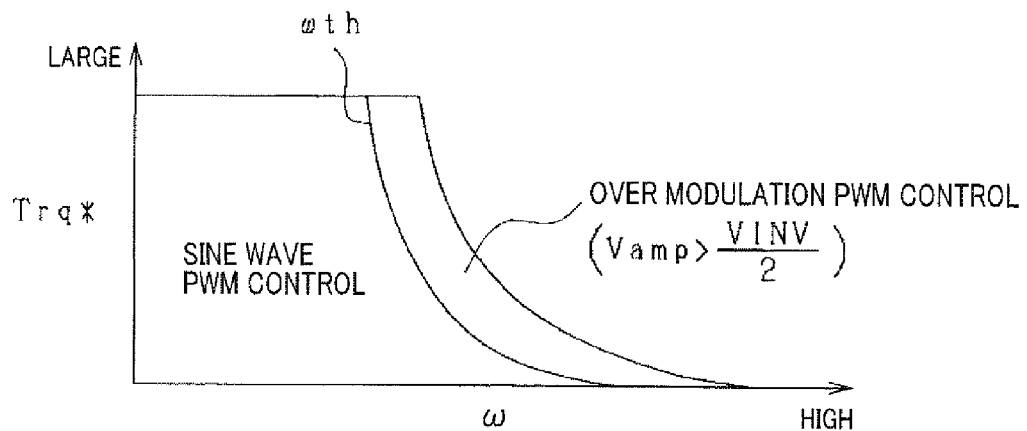
FIG. 3 is a graph showing a sine wave PWM (pulse wave modulation) control region and an over modulation PWM control region according to the first embodiment.

Especially, according to the first embodiment, as shown in FIG. 3, the PWM operating unit 56g selects either a sine wave PWM control or an over modulation PWM control based on the torque command Trq* and calculated angular velocity ω and executes the selected control. The over modulation PWM control is to control an amplitude Vamp of the command voltage v$* to be larger than an amplitude of the carrier signal tc under a condition that the amplitude Vamp is higher than one-half of the input voltage VINV of the inverter 20. It is noted that the boundary between a region for the sine wave PWM control being performed and a region for the over modulation PWM control being performed is determined by a velocity threshold wth. The velocity threshold wth is set such that the higher the torque command, the lower the velocity threshold wth. The PWM operating unit 56g outputs the generated operation signal g$# to the switching element S$#.

Figure 4:
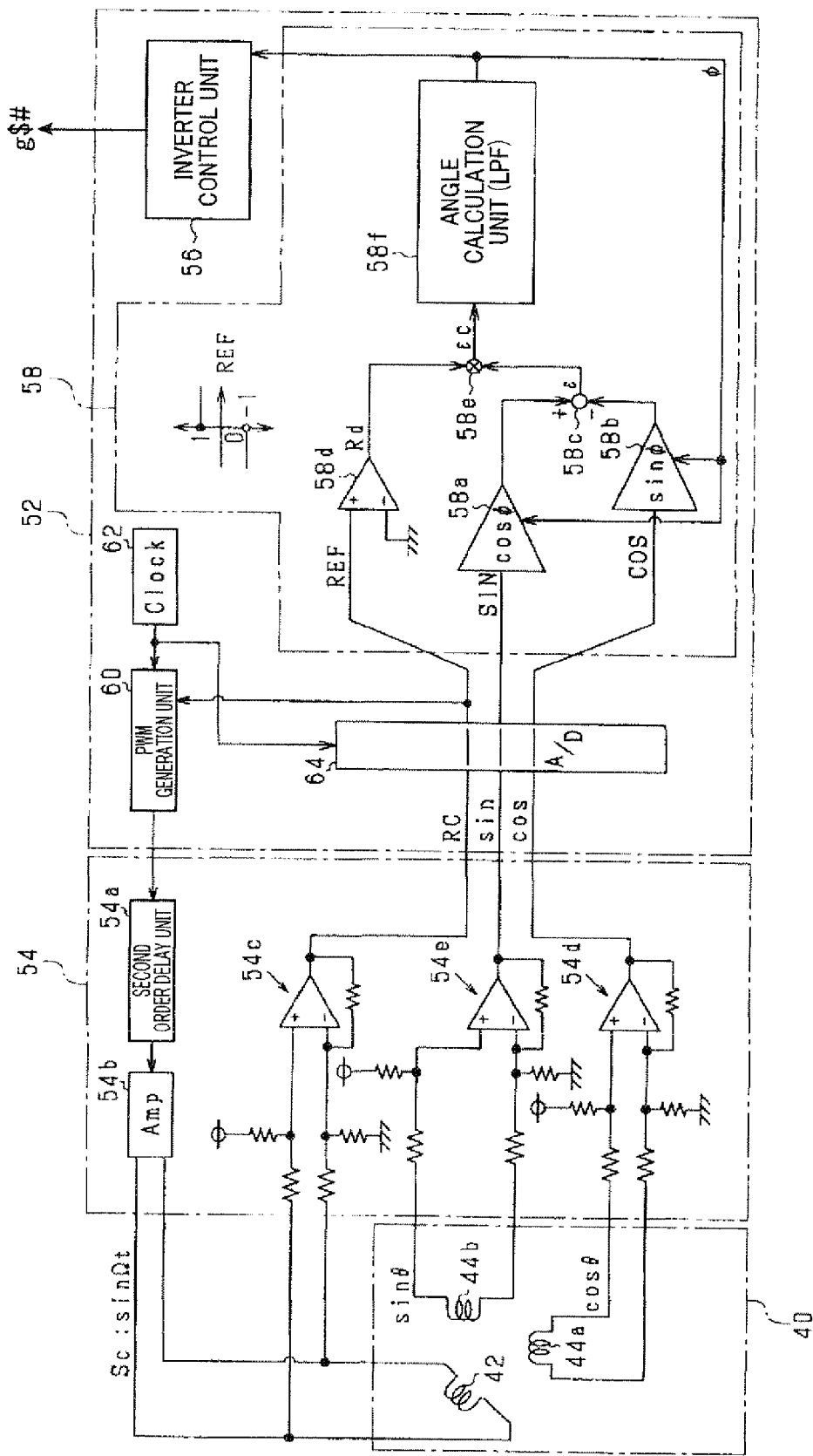
FIG. 4 is a block diagram showing a calculation process of the electrical angle according to the first embodiment.

Subsequently, with reference to FIG. 4, a calculation process for the electrical angle θ of the RD converter 58 is described as follows.

The above-described excitation signal Sc is generated by a PWM generation unit 60 and an oscillator 62 which are integrated into a microprocessor 52, a second order delay unit 54a and an amplifier 54b which are integrated to an interface circuit 54. The PWM generation unit 60 generates a PWM signal (binary signal) used for generating the excitation signal Sc, based on a magnitude-comparison between a count value Cnt being counted up by synchronizing to a clock signal transmitted from the oscillator 62 and a reference value D.

Figure 5:
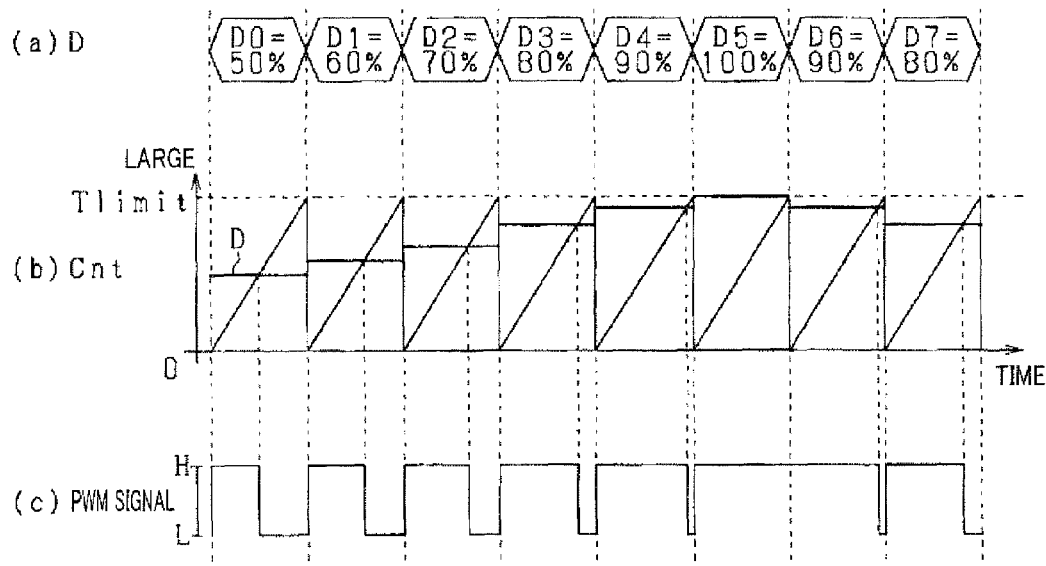
FIG. 5 is a timing diagram showing a method for generating the excitation signal based on the PWM modulation according to the first embodiment.

In FIG. 5, a change in the count value Cnt and the PWM signal is illustrated.

As shown in FIG. 5, the PWM generation unit 60 generates a logical High PWM signal when the count value Cnt is smaller than the reference value D and generates a logical Low PWM signal. When the count value Cnt reaches the upper limit Tlimit, the count value Cnt is reset. Hence, the count value Cnt becomes a saw tooth wave signal (resolver carrier signal) generated by a digital processing.

The PWM generation unit 60 updates the reference value D at every one period (one period of the resolver carrier) during which the count value Cnt reaches the upper limit Tlimit from the lower limit (0). Accordingly, the reference value D varies at a period of the excitation signal Sc.

Figure 6:
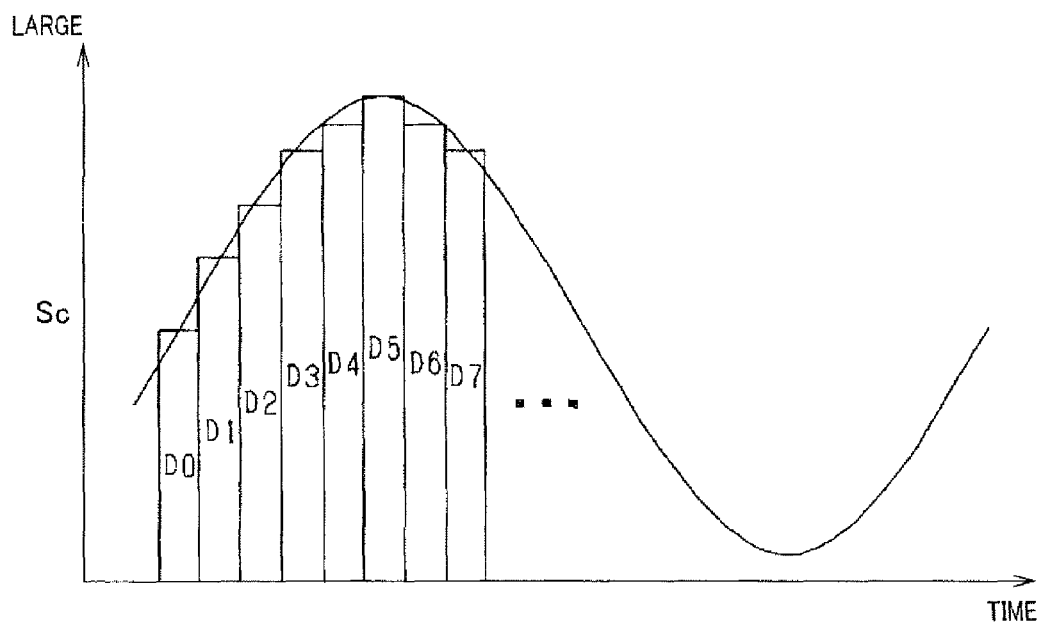
FIG. 6 is a graph showing a generating mode of the excitation signal according to the first embodiment.

Referring back to FIG. 4, the PWM signal generated by the PWM generation unit 60 is transmitted to the second order delay unit 54a and the output voltage of the second order delay unit 54a is amplified by the amplifier 54b, whereby the excitation signal Sc as shown in FIG. 6 is generated. The second order delay unit 54a, the amplifier 54b and the PWM generation unit 60 correspond to an output unit The output voltage of the amplifier 54b is voltage-converted by the first differential amplifier circuit 54c. Meanwhile, the output voltage of the secondary coil 44a is voltage-converted by the second differential amplifier circuit 54d and the output voltage of the secondary coil 44b is voltage-converted by the third differential amplifier circuit 54e. These output voltages of the amplifier circuits 54c, 54d and 54e are transmitted to the analog-digital converter (hereinafter referred to AD converter 64) integrated to the microprocessor 52. Among voltages transmitted to the AD converter 64, a voltage corresponding to the output voltage of the first differential amplifier circuit 54c is represented as "RC", a voltage corresponding to the output voltage of the third differential amplifier circuit 54e is represented as "sin" and a voltage corresponding to the output voltage of the second differential amplifier circuit 54d is represented as "cos".

The AD converter 64 is an analog to digital conversion means in which the modulated waves sin, cos and the excitation signal RC are sampled at a predetermined sampling period Tad. Specifically, the AD converter 64 converts, based on the clock signal outputted by the oscillator 62, the excitation signal RC to be digital data at a predetermined sampling period Tad (i.e., the excitation signal RC is sampled). The AD converter 64 converts, based on the above-described clock signal, the modulated signal sin to be digital data (the modulated wave sin is sampled). Further, the AD converter 64 converts, based on the clock signal, the modulated wave cos to be digital data (modulated wave cos is sampled). It is noted that the sampled excitation signal RC is indicated as reference REF and the sampled modulated waves are indicated as "SIN, COS".

According to the first embodiment, the above-described sampling period Tad is set as a predetermined fixed value (for example, 6.35 μsec). Especially, in the first embodiment, the sampling period Tad is defined as a period calculated such that one period of the excitation signal Sc is divided by integer number which is equal to or more than 2, e.g., 16. The clock signal of the oscillator 62 is used for the asynchronous carrier generator 56e as well. In other words, the same clock signal is supplied to the asynchronous carrier generator 56e, the PWM operating unit 56g and the AD converter 64.

The output signal of the AD converter 64 is transmitted to the RD converter 58 so as to perform software processing. In more detail, a cosine function multiplier 58a multiplies the modulated wave SIN by a cosine function cos $\phi$ having a calculated value of the electrical angle $\theta$ as an independent variable. Meanwhile, the sine function multiplier 58b multiplies the modulated wave COS by a sine function $\phi$ having a calculated angle $\phi$ as an independent variable. The control deviation calculation unit 58c calculates a control deviation $\epsilon$ by subtracting the output value of the sine function multiplier 58b from the output value of the cosine function multiplier 58a.

This control deviation $\epsilon$ can be expressed as the following equation (eq1) where a proportionality constant defined by the gain of the first, second, third differential amplifier circuits 54c, 54d and 54e, and the amplifier 54b are ignored.

$$E = \sin \Omega t \cdot \sin \theta \cdot \cos \phi - \sin \Omega t \cdot \cos \theta \cdot \sin \phi = \sin \Omega t \cdot \sin(\theta - \phi)$$ (eq1)

When the control deviation $\epsilon$ is 0, actual electrical angle $\theta$ and the calculated angle $\phi$ become identical. Here, a processing for eliminating the influence of the code of the excitation signal Sc by using the control deviation $\epsilon$ is processed by a synchronous detection.

Specifically, the reference signal REF is transmitted to the detection signal generation unit 58d as a binary signal calculation unit. The reference signal REF is compared with 0 (magnitude comparison) and processed to be a detection signal Rd which is either 1 or −1 based on the comparison result. In more detail, in the detection signal generation unit 58d, when the reference signal REF is 0, the detection signal Rd becomes 1 and when the reference signal REF is 1, the detection signal becomes −1.

The synchronous detection unit 58e multiplies the control deviation $\epsilon$ by the detection signal Rd so as to calculate a detected amount $\epsilon c$. The detected amount $\epsilon c$ becomes 0 when the difference between the electrical angle $\theta$ and the calculated angle $\phi$ is 0, and its sign represents whether the calculated angle $\phi$ is advanced or delayed with respect to the electrical angle $\theta$.

According to the first embodiment, the cosine function multiplier 58a, the sine function multiplier 58b, the control deviation calculation unit 58c, the detection signal generation unit 58d and the synchronous detection unit 58e correspond to a demodulation unit.

The detected amount $\epsilon c$ which is a demodulated signal outputted by the synchronous detection unit 58e (corresponding to a signal related to a rotational angle) is transmitted to the angle calculation unit 58f. The angle calculation unit 58f includes a low pass filter and an integral element. In the first embodiment, as an integral element, a doubled integral element is employed in order to avoid occurrence of a regular deviation at the calculated angle $\phi$ when the electrical angle varies at a constant velocity.

The above-described low pass filter eliminates higher harmonics in the detected amount $\epsilon c$ whereby the low pass filter outputs the calculated angle $\phi$. The characteristics of the low pass filter are described as follows.

The above-described calculate angle $\phi$ is transmitted to the cosine function multiplier 58a, the sine function multiplier 58b and the inverter control unit 56.

The inventors faced a problem that an accuracy of calculating the electrical angle at the RD converter 58 decreases when controlling the current flowing at the motor generator 10 (phase current) to be larger by operating the switching element S$# to be ON and OFF. With reference to FIGS. 7 to 13, concerning the above-described problem is described as follows.

Figure 7:
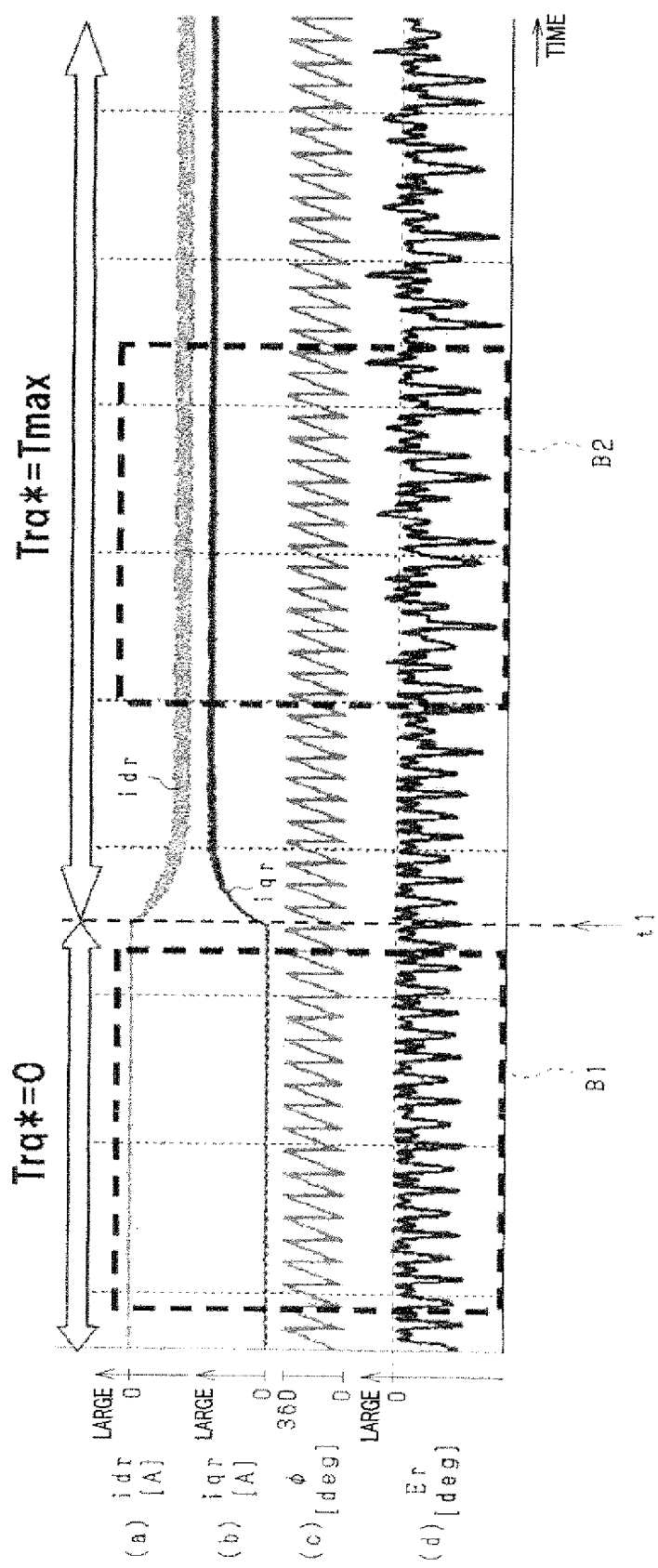
FIG. 7 is a timing diagram showing a phenomenon that a resolver error is increasing.

As shown in FIG. 7, a waveform change for various signals when the torque command Trq* is controlled to reach the maximum value (hereinafter referred to torque maximum value $T_{max}$) is illustrated.

Specifically, FIG. 7-(a) is a change of the d axis current idr, FIG. 7-(b) is a change of the q axis current iqr, FIG. 7-(c) is a change of the calculated angle $\phi$ and FIG. 7-(d) is a change of the error of the calculated angle $\phi$ with respect to the electrical angle (hereinafter referred to resolver error Er).

In the examples as shown in FIG. 7, at the time t1, the torque command Trq* changes to the torque maximum value $T_{max}$ from a value 0. The resolver error Er occurs at the time t1 and increases after the time t1.

Figure 8:
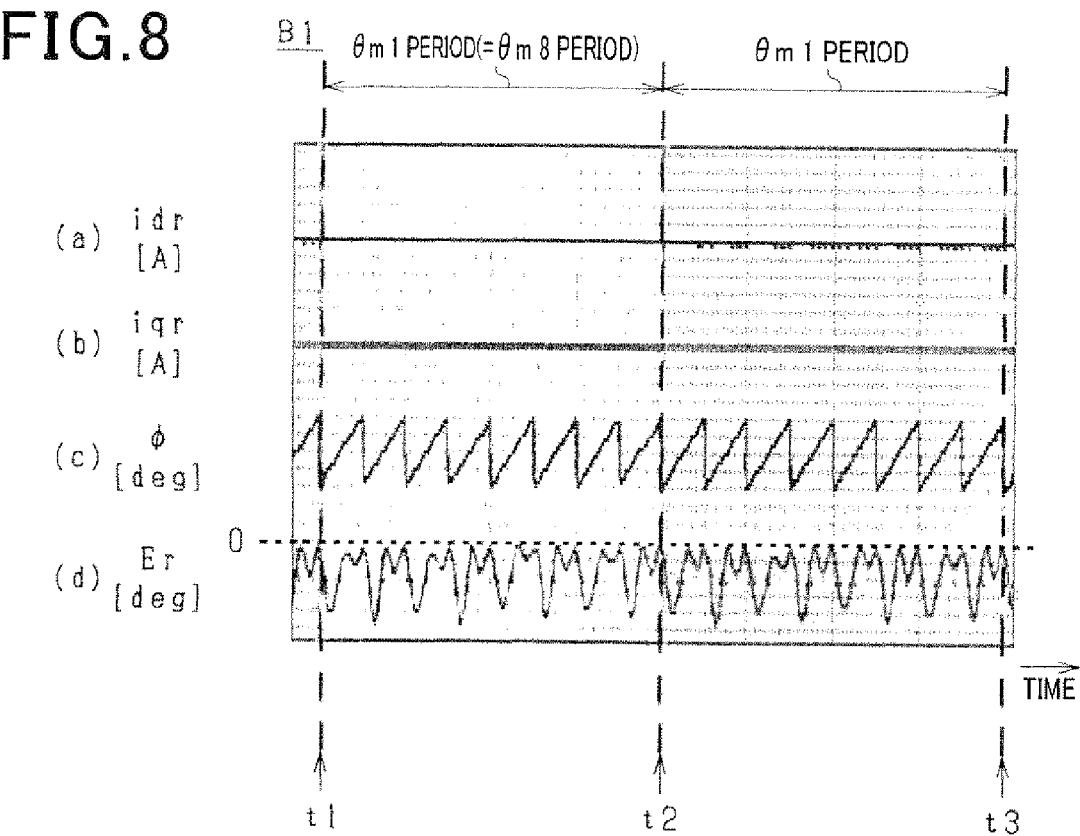
FIG. 8 is a timing diagram showing a change in the resolver error.
Figure 9:
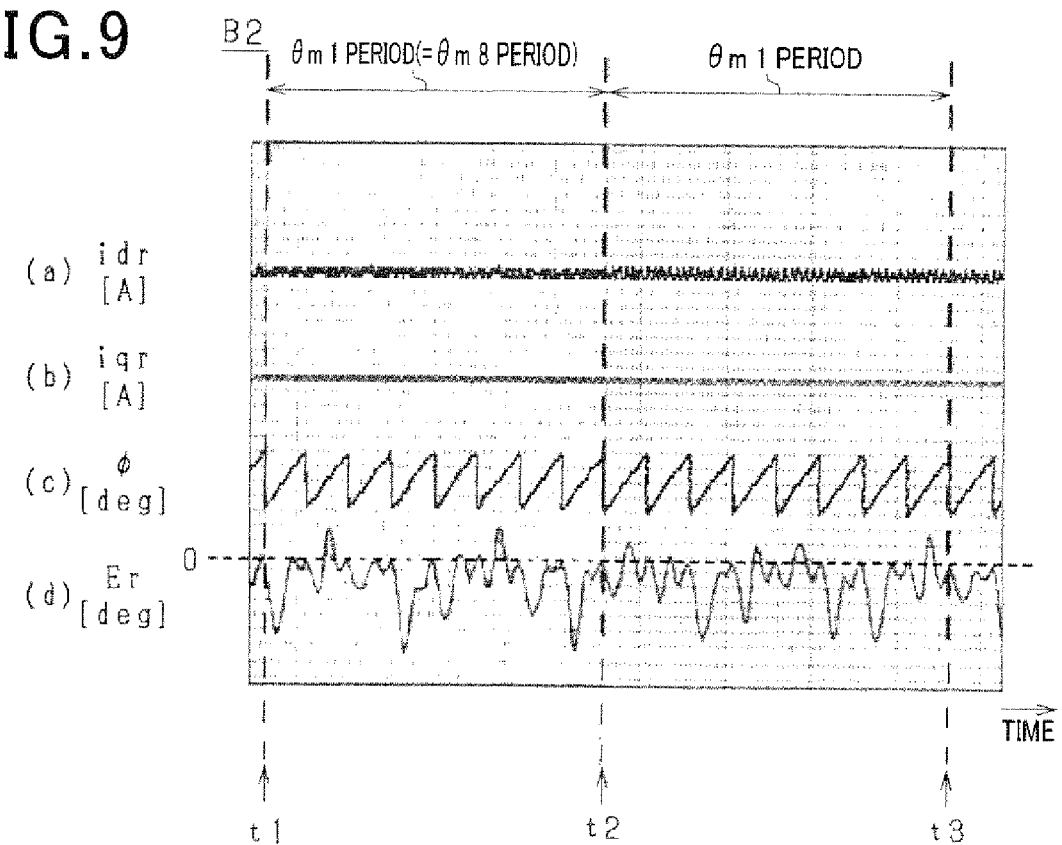
FIG. 9 is a timing diagram showing a change in the resolver error.

FIG. 8 is an enlarged timing diagram in which the time scale at B1 corresponding to the torque command Trq* being 0 is enlarged. FIG. 9 is an enlarged timing diagram in which the time scale at B2 corresponding to the torque command Trq* being the torque maximum value Tmax is enlarged. According to the first embodiment, the above-described 8 axial double angle is used for the resolver 40. Therefore, in FIGS. 9 and 10, 8 periods of the electrical angle $\theta$ corresponds to one mechanical angle $\theta m$.

As shown in FIG. 8, even when the torque command Trq* is 0, the resolver error Er occurs. However, the error Er has a periodic characteristic that synchronizes to one electrical angle $\theta 1$. To reduce the resolver error Er, a calibration logic to calibrate the resolver error Er can be configured with this periodic characteristic. For example, a resolver error Er during a period at the previous mechanical angle $\theta m$ (time t1 to t2) is stored for corresponding respective periods at the electrical angle $\theta$. Then, based on the previous resolver error Er stored for the respective periods at the electrical angle $\theta$ that constitutes a period of the mechanical angle $\theta m$, the calculated angle $\phi$ is calibrated so as to reduce the resolver error Er.

In this regard, as shown in FIG. 9, when the torque command Trq* is the torque maximum value Tmax, the resolver error Er increases and the periodic characteristic of the resolver error Er is not maintained. Hence, the above-described calibration logic that uses the characteristic being synchronized to the electric angle θ cannot reduce the resolver error Er.

Figure 10:
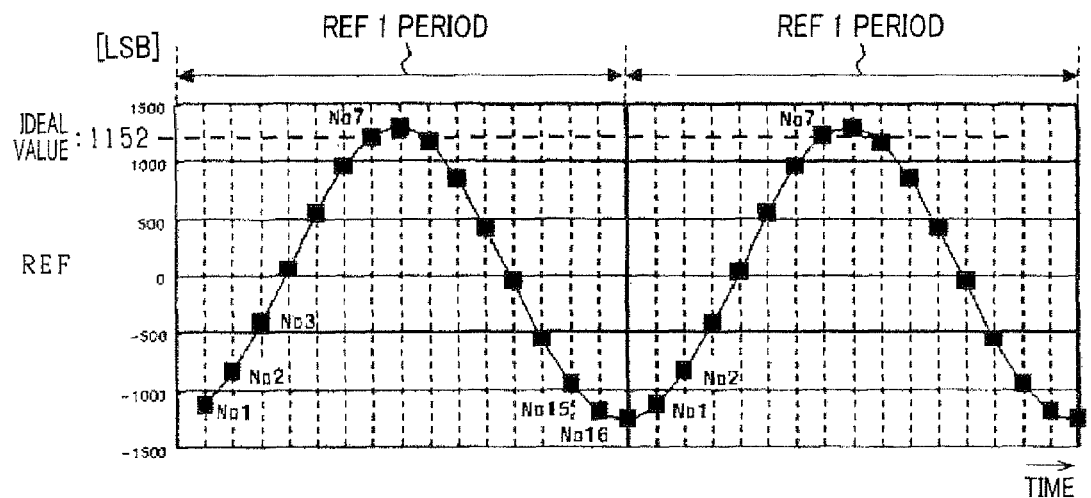
FIG. 10 is a timing diagram showing a sampling of the excitation signal.

FIG. 10 is a timing diagram showing an ideal change in the reference signal REF when the sampling period Tad is set to be 6.25 μsec and one period of the excitation signal Sc is set to be 100 μsec. It is noted that the reference signal REF is indicated as a digital unit.

As shown in FIG. 10, according to the first embodiment, the sampling period Tad is set such that the one period of excitation signal Sc is divided by an integer. Hence, Nth sampling value become identical at every period of the ideal reference signal REF. In FIG. 10, an example that 7th data become identical between two consecutive periods of the reference signal REF is illustrated (the data is indicated as an ideal value in FIG. 10).

Figure 11:
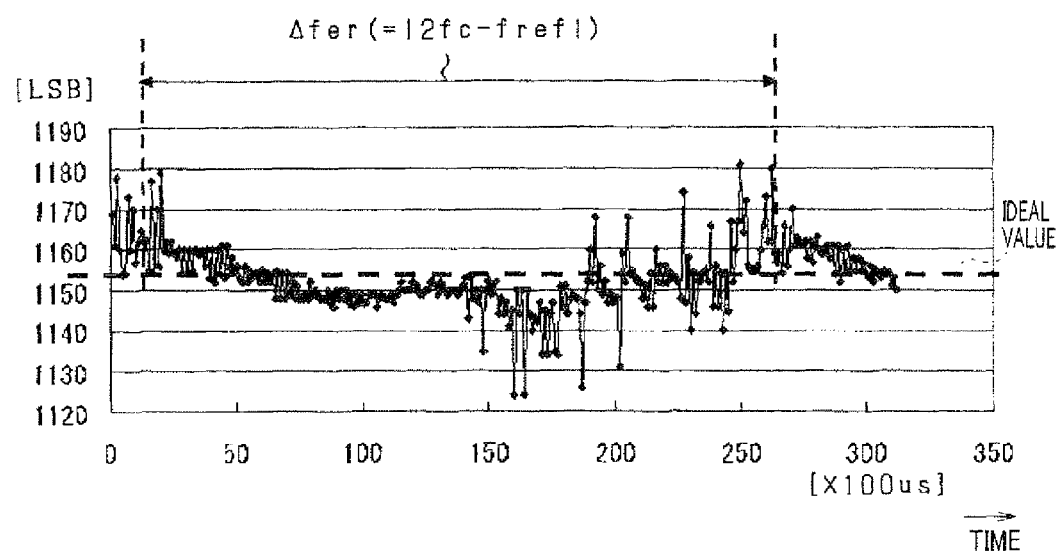
FIG. 11 is a timing diagram showing an occurrence of resolver error with respect to the ideal value.

In FIG. 11, an actual measurement data of the reference signal REF is shown under a condition that the motor generator is controlled to rotate at 1000 rpm and the frequency of the carrier signal is set to be 4.98 KHz. Specifically, in FIG. 11, respective 7th data at every period of the reference signal REF are illustrated sequentially in time.

As shown in FIG. 11, the reference signal REF has an identical value (as described above), when no noise has occurred on the reference signal REF. Practically, a resolver error Er having an error frequency $\Delta$fer (e.g., 40 Hz) has occurred. In this respect, the inventors have found that the error frequency $\Delta$fer becomes an absolute value of a difference between a doubled carrier frequency fc and a frequency of the excitation signal Sc (hereinafter referred to excitation frequency fref).

Figure 12:
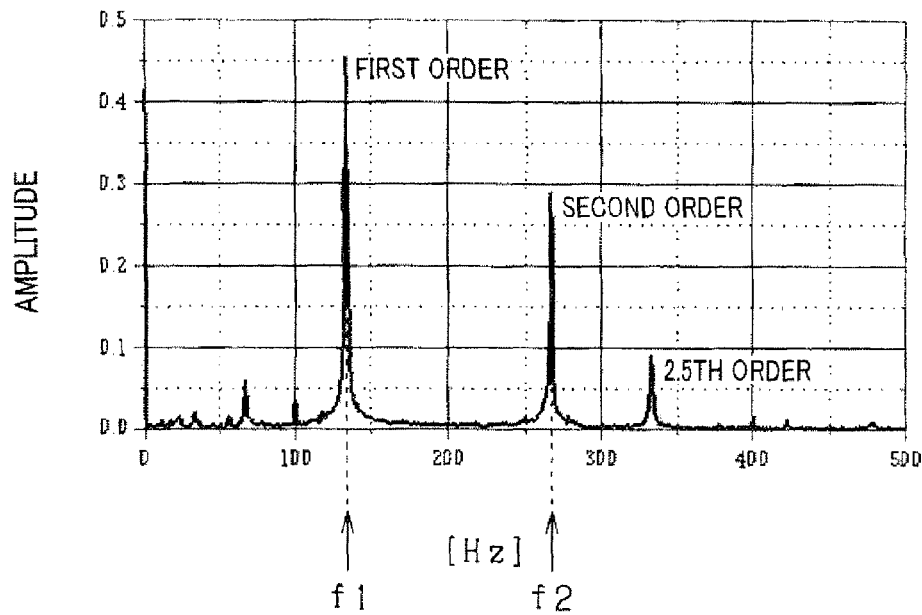
FIG. 12 is a graph showing a frequency analysis of the resolver error.
Figure 13:
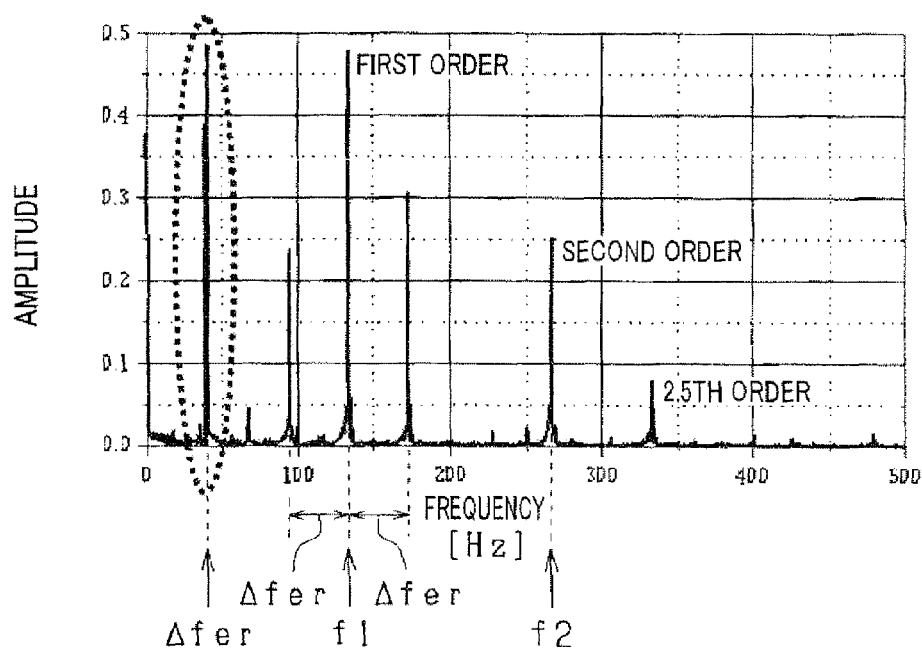
FIG. 13 is a graph showing a frequency analysis of the resolver error.

In FIGS. 12 and 13, a result of frequency analysis for the reference signal REF is shown. FIG. 12 is an analysis result when the torque command Trq* is 0 and FIG. 13 is an analysis result when the torque command Trq* is the torque maximum value $T_{max}$. It is noted that the rotational speed of the motor generator 10 is set to be 1000 rpm.

As shown in FIG. 12, when the torque command Trq* is 0, a resolver error Er having 1st order, 2nd order and 2.5th order harmonics has occurred. These error components were previously shown in FIG. 8-(d). These errors occur due to variation of the manufacturing process for producing the resolver 40, accuracy for mounting the resolver 40 and etc.

Whereas, as shown in FIG. 13, when the torque command Trq* is the torque maximum value $T_{max}$, the resolver error ER having the error frequency $\Delta$fer becomes larger. That is, the torque command Trq* becomes larger, a phase current flowing through the motor generator 10 increases and switching noise increases. As a result, a resolver error having an error frequency sufficiently lower than variation component (fundamental wave component) of the excitation signal Sc and a phase current will increase. In FIG. 13, an occurrence of a first order side band wave due to an increase of the torque command Trq* is illustrated as well.

An occurrence of the resolver error Er causes a torque variation of the motor generator 10 so that the torque of the motor generator 10 may not be controlled accurately (degrading controllability of the torque). It is considered that the resolver error increases, under a condition that the torque command Trq* is increasing, when not only the reference signal REF has noise but also when noise mixes with a signal at upstream side of the low pass filter (e.g., modulated wave SIN and COS) that constitutes the angle calculation unit 58f.

Figure 14:
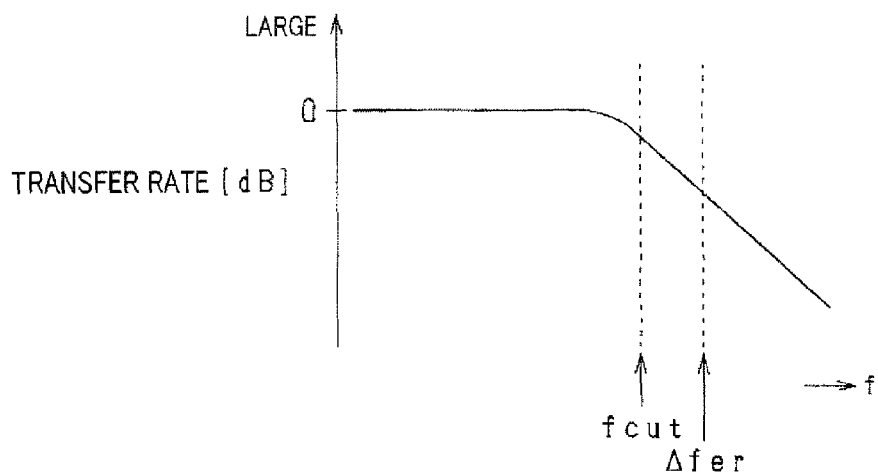
FIG. 14 is a graph explaining a configuration of the angle calculation unit.

Accordingly, in the first embodiment, the low pass filter that constitutes the angle calculation unit 58f is configured as shown in FIG. 14. Specifically, the excitation frequency fref and the carrier frequency fc are set such that the error frequency $\Delta$fer (which is an absolute value of a difference between the doubled carrier frequency fc and the excitation frequency fref) is set to be higher than the cutoff frequency $\Delta$cut of the low pass filter (i.e., cutoff region). As a result, noise components of which the frequency is higher than the error frequency $\Delta$fer included in the reference REF can be eliminated by the angle calculation unit 58f. Therefore, degrading controllability of the torque can be preferably avoided.

According to the above-described embodiment, the following advantages can be obtained.

(1) The excitation frequency fref and the carrier frequency fc are set such that the error frequency $\Delta$fer (which is an absolute value of a difference between the doubled carrier frequency fc and the excitation frequency fref) is in a cutoff frequency range of the low pass filter 58f that is the angle calculation unit 58f. Accordingly, the low pass filter suppresses the noise influencing the accuracy of calculation of the electrical angle $\theta$ even when the noise mixes with the demodulated signal outputted from the synchronous detection unit 58e by noise mixing to the reference signal REF and the modulated waves SIN and COS. As a result, degrading the calculation accuracy of the electrical angle $\theta$ can be avoided and also, degrading controllability of the torque can be preferably avoided.

Especially, according to the first embodiment, a low pass filer is employed for a filter that constitutes the angle calculating unit 58f, the error frequency $\Delta$fer is set to be the absolute value of a difference between the doubled carrier frequency fc and the excitation frequency fref. Moreover, the excitation frequency fref and the carrier frequency fc are set such that the error frequency $\Delta$fer is set to be higher than the cutoff frequency fcut of the low pass filter. As a result, these configurations significantly contribute so as to avoid degrading accuracy of the calculating the electrical angle $\theta$.

Second Embodiment

With reference to the drawings, difference between the configuration of the second embodiment and the one of the first embodiment is mainly described as follows.

According to the second embodiment, the carrier frequency fc is set to be variable so as to eliminate the resolver error Er.

Figure 15:
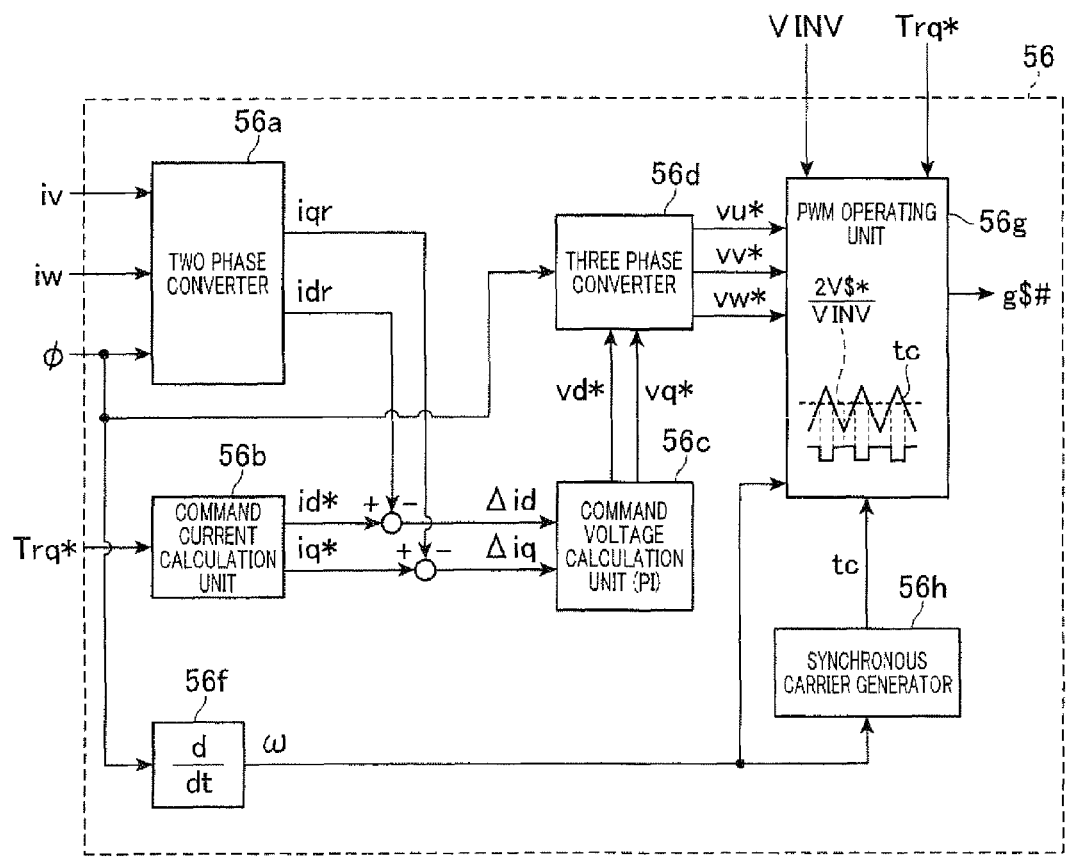
FIG. 15 is a block diagram showing a control process of the motor generator according to the second embodiment.

FIG. 15 is a block diagram showing a torque control according to the second embodiment. In FIG. 15, the same reference numbers are applied to components identical to that of the first embodiment.

As shown in FIG. 15, according to the second embodiment, instead of the asynchronous carrier generator 56e, a synchronous carrier generator 56h is included in the inverter control unit 56. The synchronous carrier generator 56h generates, based on the calculated angular velocity $\omega$, a carrier signal tc such that one period of the calculated angle $\phi$ is equivalent to an integral multiple of a period of the carrier signal tc, and outputs the generated carrier signal tc. It is noted that the inverter control unit 56 constitutes the synchronous PWM operating unit according to the second embodiment.

Figure 16:
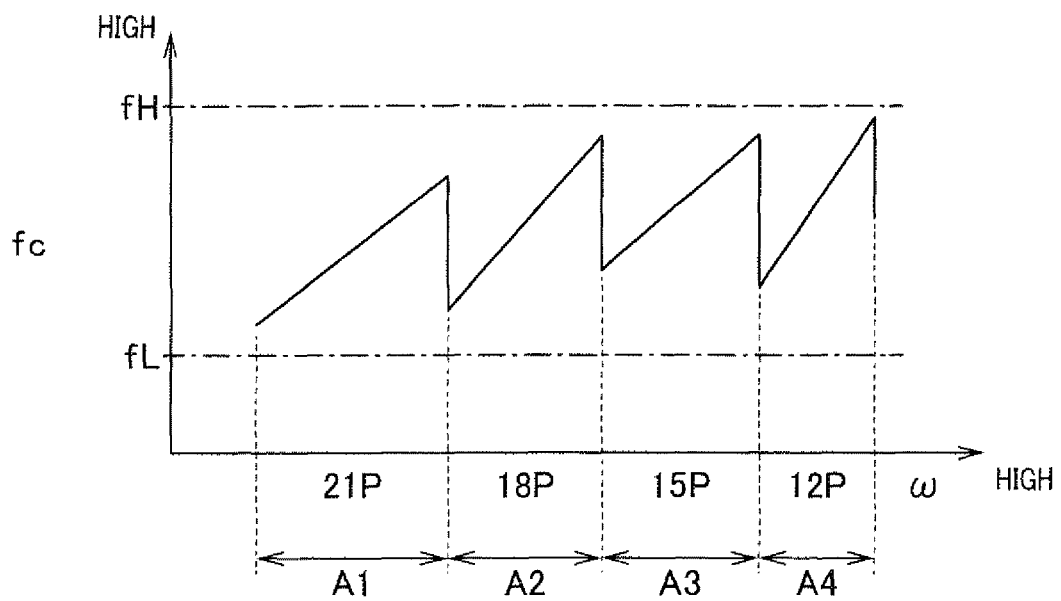
FIG. 16 is a graph showing a synchronous PWM control according to the second embodiment.

As shown in FIG. 16, a method for generating the carrier signal tc executed by the synchronous carrier generator 56h is illustrated. Specifically, the horizontal axis of FIG. 16 shows the calculated angular velocity $\omega$ and the vertical axis thereof shows the carrier frequency fc.

In the example as shown in FIG. 16, the calculated angular velocity $\omega$ is divided to 4 region A1 to A4. In the respective regions, the higher the calculated angular velocity $\omega$, the higher the carrier frequency fc. Also, carrier frequency fc at the respective regions ranges between the upper carrier frequency fH and the lower carrier frequency fL. The upper carrier frequency fH and the lower carrier frequency fL is set so as to avoid an over heating/ an over current of the switching element S$# thereby maintaining reliability of the switching element S$#. In FIG. 16, the number of carrier signals tc in one period of the output voltage of the inverter 20 is exemplified such that the first region A1 has 21, the second region A2 has 18 carrier signals, the third region A3 has 15 carrier signals and the fourth region A4 has 12 carrier signals.

When synchronous PWM control is performed, the carrier frequency fc changes in response to the calculated angular velocity $\omega$ whereby the error frequency $\Delta$fer may be less than the cutoff frequency of the low pass filter. In this case, there is a concern that the resolver error Er increases to degrade a controllability of the torque.

In the second embodiment, a variable frequency setting is performed, which is described as follows.

Figure 17:
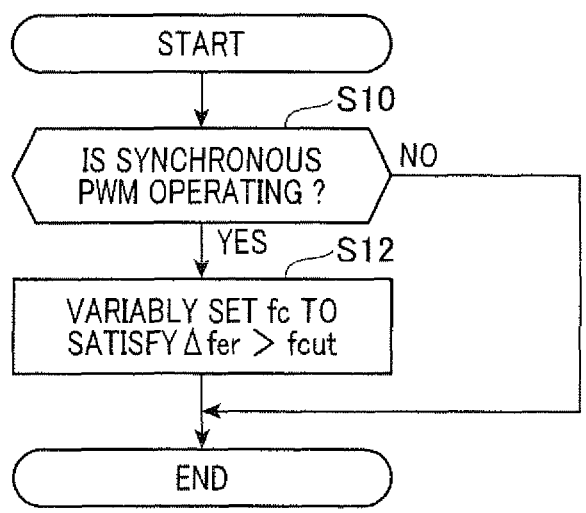
FIG. 17 is a flowchart showing a process of variable frequency setting according to the second embodiment.

In FIG. 17, a process of the variable frequency setting according to the second embodiment is illustrated. This process is repeatedly executed with a predetermined period by the microprocessor 52.

In these series processes, at step S10, the microprocessor 52 determines whether or not the synchronous PWM control is being executed, When the determination at step S10 is YES, the control proceeds to step S12 and sets the carrier frequency fc to be variable such that the error frequency Δfer exceeds the cutoff frequency fcut. As a result, for example, as shown in FIG. 16, under a condition that the calculated angular velocity ω at the second region A2 gradually increases so that the carrier frequency fc decreases, the carrier frequency fc is set to avoid a carrier frequency corresponding to the error frequency Δfer being less than the cut off frequency fcut. It is noted that the process at step S10 corresponds to the setting unit.

Figure 18A:
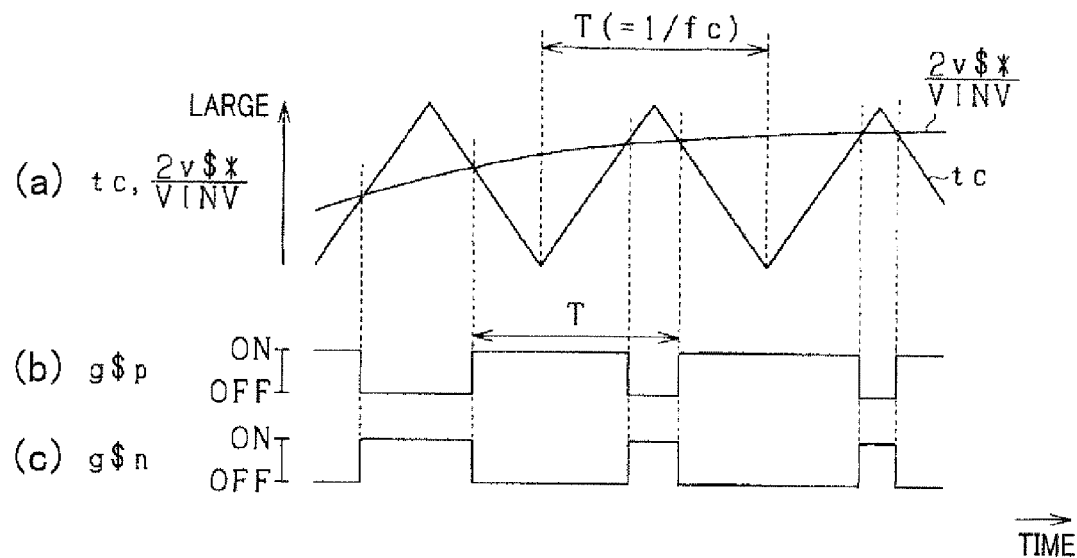
FIGS. 18A and 18B are timing charts showing a variable setting of the carrier frequency according to the second embodiment.
Figure 18B:
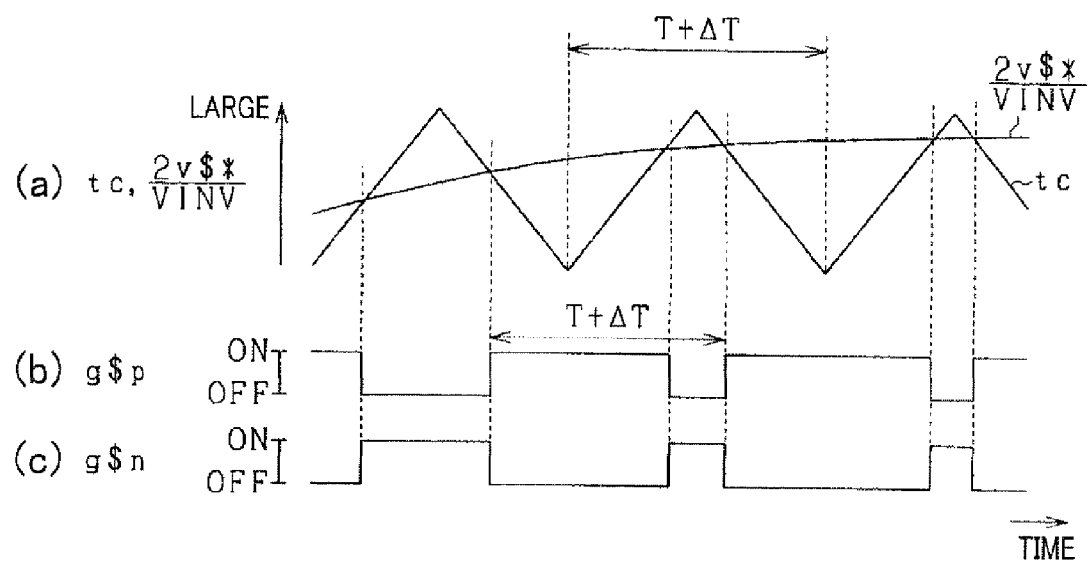

The control terminates the series of processes when the determination at step S10 is NO or when the control completes the process at step S12, FIGS. 18A and 18B are graphs showing a change of various waveforms before/ after the carrier frequency fc is changed. Specifically, FIG. 18A-(a) and FIG. 18B-(a) illustrates a change of a value where the input voltage v$* is normalized by the input voltage VINV, FIG. 18A-(b) and FIG. 18B-(b) illustrates a change of a high side operation signal g$p and FIG. 18A-(c) and FIG. 18B-(c) illustrates a change of a low side operation signal g$n. FIG. 18B is a graph showing a change of waveforms in which the period of the carrier frequency tc as shown in FIG. 18A is extended by ΔT. As shown in FIGS. 18A and 18B, illustrating a dead time is omitted.

As shown in FIGS. 18A and 18B, when the period of the carrier signal tc is extended, the switching period of the switching element S$# is extended as well. In other words, the lower the carrier frequency fc, the lower the frequency of the switching element S$#

According to the above-described embodiment, the following advantages are obtained.

(2) The carrier frequency fc is set to be variable such that the error frequency Δfer is higher than the cutoff frequency fcut, while the synchronous PWM control is performed, whereby degrading controllability of the torque can be preferably avoided.

(3) The carrier frequency fc is used for the object frequency. Since, only the carrier frequency fc is changed to reduce the resolver error Er, a control logic to reduce the resolver error ER can readily be designed.

Third Embodiment

With reference to the drawings, difference between the configuration of the third embodiment and the one of the second embodiment is mainly described as follows.

According to the third embodiment, the excitation frequency fref is used for the object frequency instead of the carrier frequency fc, so as to eliminate the resolver error Er.

Figure 19:
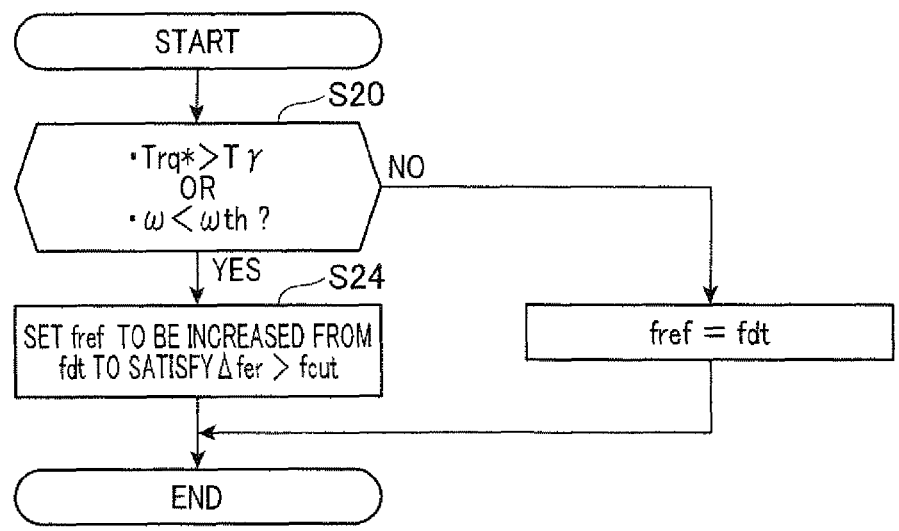
FIG. 19 is a flow chart showing a process of a variable frequency setting according to the third embodiment.

In FIG. 19, a process of the variable frequency setting according to the third embodiment is described as follows. It is noted that this process is repeatedly executed by the microprocessor 52 at a predetermined period.

In this series of processes, at step S20, the control determines whether or not a logical OR operation between a condition that the torque command Trq* exceeds the torque control value Ty and a condition that the calculated angular velocity ω is less than the velocity threshold ωth is true. This process is to determine whether or not the excitation frequency should be changed variably. The meaning of this process is described as follows.

According to the third embodiment, the initial value of the excitation frequency fref is set to be lower value. The reason why the initial value of the excitation frequency fref is lower value is that the lower the excitation frequency, the lower the current consumption of a circuit that generates the excitation signal Sc (e.g., the PWM generation unit 60). Therefore, an initial frequency fdt may be shifted to lower frequency from the above-described doubled carrier frequency so as to satisfy a condition that the frequency difference between the doubled carrier frequency fc and the initial frequency fdt is higher than the cutoff frequency fcu. However, according to the third embodiment, the initial frequency fdt cannot be shifted to lower frequency side because accuracy for detecting the electrical angle θ decreases when the excitation frequency fref is set to be excessively lower value. In this respect, according to the third embodiment, taking into consideration of a reduce of the resolver error Er and a suppression of the current consumption of the PWM generation unit 60, the initial frequency fdt is set to be lowered and the following two conditions are employed.

The first condition is regarding the torque command Trq*. When the torque command Trq* is large, the phase current flowing through the motor generator 10 increases so that the resolver error Er becomes large. Meanwhile, when the torque command Trq* is small, the phase current becomes small so that the resolver error Er becomes small as well. If the resolver error Er is small, even when the error frequency Δfer is less than the cutoff frequency fcut, the resolver error Er influences the accuracy of calculating the electrical angle θ less.

Subsequently, the second condition relates to the calculated angular velocity ω. According to the third embodiment, when the calculated angular velocity ω exceeds the velocity threshold ωth, an over modulation PWM control is performed. The switching frequency of the over modulation PWM control tends to be lower than that of the sine wave PWM control. Hence, the error frequency Δfer when the over modulation PWM control is performed tends to be higher than the error frequency Δfer when the sine wave PWM control is performed. According to the third embodiment, the error frequency Δfer when the over modulation PWM control is set to be higher than the cutoff frequency fcut. Accordingly, the resolver error ER when the over modulation PWM control is performed is eliminated by the low pass filter. As a result, even when the over modulation PWM control is performed, it is considered that the resolver error Er has less influence on the accuracy of calculating the electrical angle θ.

When the determination at step S20 is NO, the control proceeds to step S22 and sets the initial frequency fdt as an excitation frequency fref.

Figure 20:
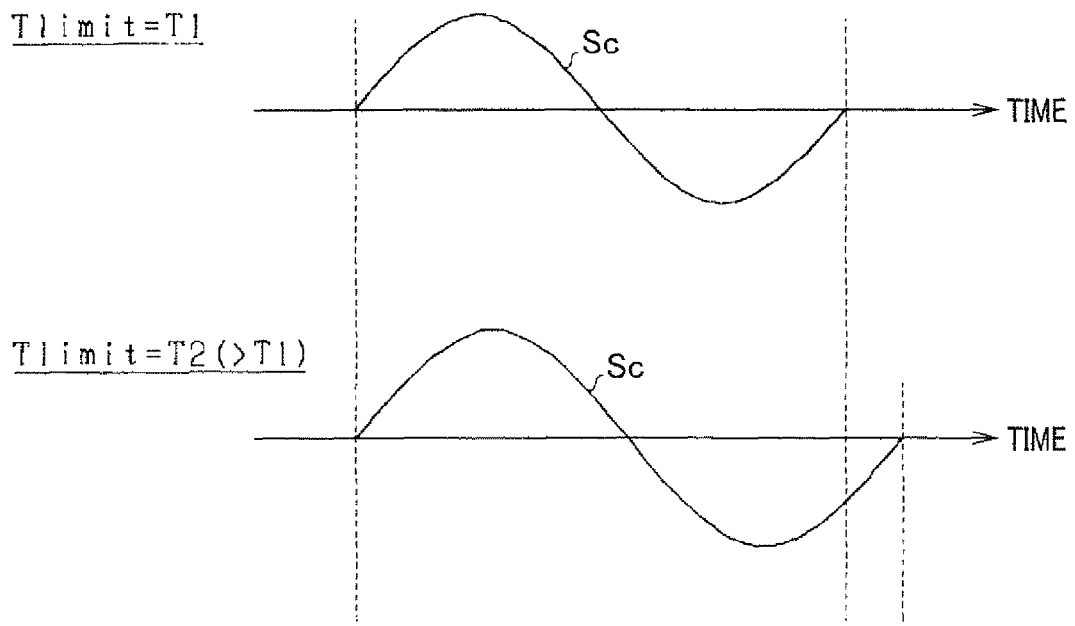
FIG. 20 is a timing chart showing a variable setting of the excitation frequency according to the third embodiment.

Meanwhile, when the determination at step S20 is YES, the control proceeds to step S24 and controls the excitation frequency fref to be increased from the initial frequency fdt so that the error frequency Δfer becomes higher than the cutoff frequency fcut. This process is accomplished by increasing the upper limit Tlimit as shown in FIG. 5. In FIG. 20, an example that the upper limit Tlimit increases whereby the excitation frequency fref decreases is exemplified. It is noted that the process at the step S24 corresponds to the setting unit.

When the control determines No at the above-described step S20 after the process is executed at step S24, the excitation frequency fref is decreased to be the initial frequency fdt at step S22. The series of processes are terminated when the processes at step S22 and step S24 are completed.

According to the above-described third embodiment, the following advantages can be obtained in addition to the advantages obtained in the second embodiment.

(4) The excitation frequency fref is controlled to be increased such that the error frequency Δfer is higher than the cutoff frequency fcut under a condition that logical OR function between a condition that the torque command Trq* exceeds the torque control value Ty and a condition that the calculated angular velocity ω is less than the velocity threshold ωth is met. Therefore, both the resolver error Er and the current consumption of the circuit for generating the excitation signal can be reduced at the same time.

Fourth Embodiment

With reference to the drawings, difference between the fourth embodiment and the third embodiment is mainly described as follows.

Figure 21:
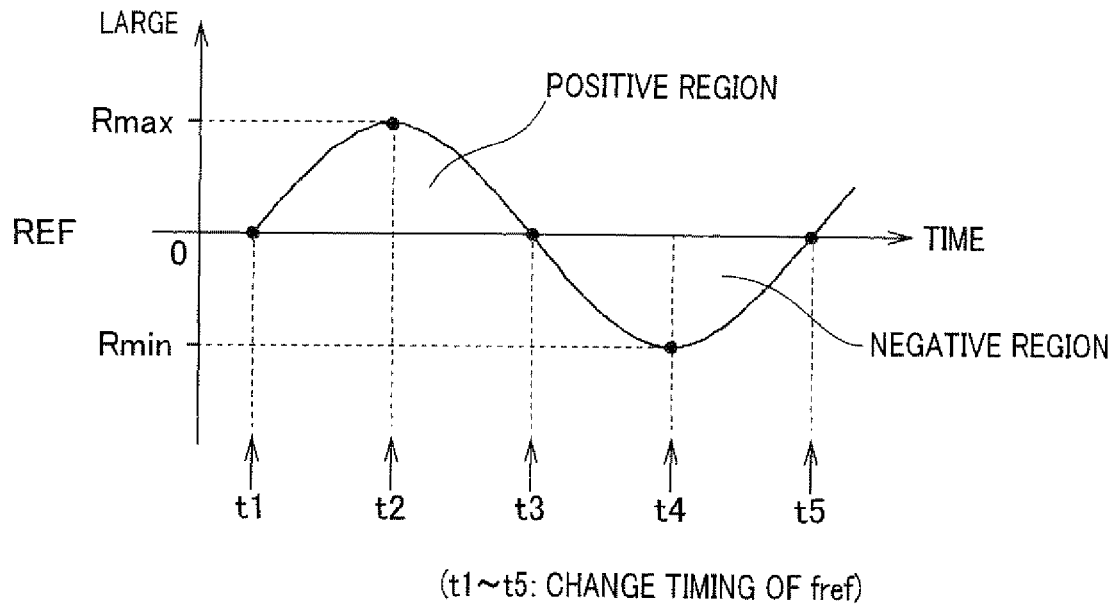
FIG. 21 is a graph showing a change timing of the frequency according to the fourth embodiment.

As shown in FIG. 21, according to the fourth embodiment, a process where the excitation frequency fref is changed at step S22 and S24 as shown in FIG. 19, is enabled at a zero cross timing of the reference REF (i.e., time t1, t3 and t5), at a timing where the reference REF becomes the maximum value Rmax (i.e., time t2) or at a timing where the reference REF becomes the minimum value Rmin (i.e., time t4).

As shown in FIG. 21, the excitation frequency is changed at the above-described timings t1 to t5. It is required that the positive region and the negative region of the reference REF with respect the amplitude 0 point (i.e., average value 0 of the reference REF) during the one period should be symmetric. If the positive region and the negative region are not symmetric with respect to the amplitude 0 point, the area of the positive region and the area of the negative region become different. Then, a problem arises that a DC (direct current) component included in the control input (e.g., detected amount ϵc) of the feedback control system increases so that the calculation accuracy of the electrical angle θ decreases. In this respect, the change timing of the excitation frequency fref is set as timings as shown in FIG. 21, whereby the above-described symmetric regions are secured. As a result, an accuracy of calculating the electrical angle θ is avoided from degrading when the excitation frequency is changed.

Fifth Embodiment

With reference to drawings, difference between the fifth embodiment and the second embodiment is mainly described as follows.

According to the fifth embodiment, a process at step S20 (as shown in FIG. 19) of the third embodiment is adapted to a configuration of the second embodiment in which the carrier frequency fc is set to be variable.

Figure 22:
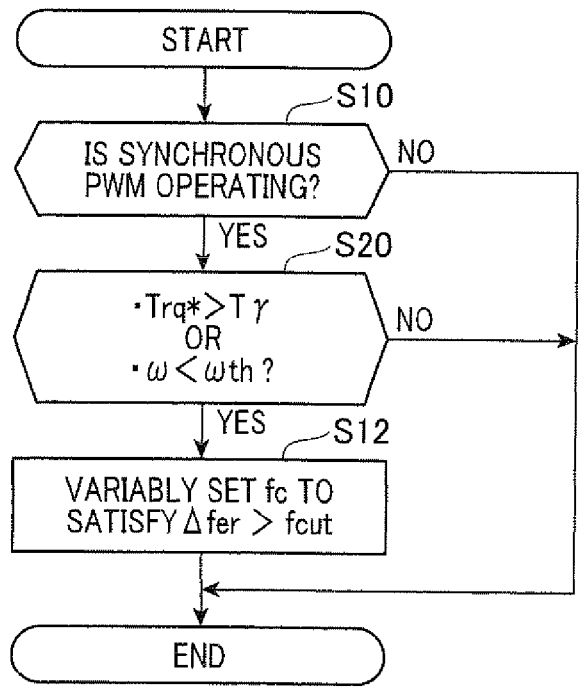
FIG. 22 is a flowchart showing a process of the variable frequency setting according to the fifth embodiment.

The variable frequency setting of the fifth embodiment is shown in FIG. 22. This process is executed, by the microprocessor 52, for example, repeatedly at a predetermined period.

In this series of processes, when the determination at step S10 is YES, the control proceeds to step S20. The control proceeds to step S12 when the determination at step S20 is YES.

When the determination at step S10 or step S20 is NO or when the process at step S12 is completed, the series of processes are terminated.

According to the above-described fifth embodiment, advantages of the third embodiment can be obtained in addition to that of the second embodiment.

Other Embodiment

The above-described embodiments can be modified as follows.

In the above-described third and fifth embodiment, at step S20, conditions of the torque command Trq* may be changed to a condition that the amplitude or the rms (root-mean-square) value of the phase current is higher than a desired current.

According to the third embodiment and the fifth embodiment, the desired velocity being compared with the calculated angular velocity is set based on whether or not the over modulation PWM control is executed. However, it is not limited to this setting. For example, assuming a RD converter 58 has a characteristic in which the higher the rotational angular velocity (electrical angular velocity) of the rotor 10a, the lower the resolver error Er, the desired velocity can be set based on the characteristic of the resolver error being lowered. In this case, the desired velocity can be set to be constant regardless of the torque command Trq*.

The error frequency Δfer is set to be higher than the cutoff frequency fcut, however, it is not limed to this error frequency Δfer being set as higher than the cutoff frequency. For example, the error frequency Δfer may be set within the cutoff frequency range where the transfer rate (gain) of the low pass filter becomes 0 dB. Even in this case, the resolver error Er can be reduced.

Regarding the frequency of the variable component in the current flowing through the rotating machine which determines the error frequency, it is not limited to a doubled frequency of the carrier frequency fc (switching frequency). For example, a frequency where the carrier frequency fc is multiplied by M (referred to multiplied frequency, where M is integer number larger than or equal to three) can be employed under a condition that a resolver error Er significantly influences accuracy for calculating the electrical angle θ (the resolver error Er is determined such that the error frequency Δfer is difference between the multiplied frequency and the excitation frequency fref). In this case, the resolver error Er having an error frequency Δfer determined by the above-described frequency difference can be eliminated by the low pass filter.

Regarding the operating unit, it is not limited to the PWM control by using the carrier signal tc. For example, the control unit 50 may include a memory unit (e.g., non-volatile memory) in which a pulse pattern associated with the torque command Trq* and the calculated angular velocity ω is stored, and the switching element S$# is controlled to be ON and OFF according to the pulse pattern selected based on the torque command Trq* and the calculated angular velocity ω. The pulse pattern is a PWM signal that defines ON-OFF state of one switching period. In this case, a pulse pattern used for the over modulation operating unit is stored to the memory unit as well. This pulse pattern is used to compensate an amount of insufficient output voltage with respect to the command value and control the switching element to be ON and OFF under a condition that the amplitude of the command voltage exceeds the input voltage of the inverter 20.

Regarding the object frequency, it is not limited to either the excitation frequency or the switching frequency, however, both the excitation frequency and the switching frequency can be used for the object frequency.

As a filter, it is not limited to the low pass filter, however, a band elimination filter (BEF) can be used for the filter. Even in this case, when the excitation frequency and the switching frequency is set such that the error frequency is included in the cutoff frequency range, advantages of the present disclosure can be obtained.

In the first embodiment, when the reference REF is larger than 0, the detection signal RD can be set as 1 and when the reference REF is smaller than 0, the detection signal can be set as −1. Moreover, as a detection method to demodulate the modulated wave, it is not limited to using the above-described detection signal RD, however, a method in which the control deviation ε is multiplied by the reference REF directly can be employed.

As a control deviation ε, a value sin (θ+φ) which is a sum of the output value of the cosine function multiplier 58a and the output value of the sine function multiplier 58b can be used. In this case, since the calculated angle φ is calculated as a negative value, the sign of the above-described calculated angle is inverted so as to obtain actual electrical angle θ.

The sampling period Tad is not limited to a period synchronized to a period where one period of the excitation signal is divided by N (N is two or more integer number), however, the sampling period Tad can be a period not synchronized to the above-described period.

In the first embodiment, as a count value (resolver carrier) used to generate a PWM signal, it is not limited to a count value synchronized to the clock signal to count up the clock pulse, however, a count value which counts down the clock pulse can be employed.

As a switching element, it is not limited to the IGBT, however, a MOSFET can be employed. As a DC-AC conversion circuit, it is not limited to the three-phase inverter, however, a full-bridge circuit can be employed.

What is claimed is:

1. A control apparatus for controlling a rotating machine wherein a current flowing through the rotating machine is controlled by a DC-AC conversion circuit electrically connected thereto, the control apparatus comprising:
   a signal output unit that outputs an excitation signal to a resolver used for detecting a rotational angle of the rotating machine, the resolver generating a modulated signal where the excitation signal is amplitude-modulated in response to the rotational angle of the rotating machine;
   a demodulation unit that demodulates a signal related to the rotational angle based on a detection of the modulated signal and the excitation signal, and outputs a demodulated signal;
   a filter that eliminates higher harmonics in the demodulated signal outputted by the demodulation unit so as to output a calculated angle of the rotational angle, the filter having a cutoff region determined by a cutoff frequency thereof;
   an operating unit that controls a switching element included in the DC-AC conversion circuit to be ON and OFF based on the calculated angle of the rotational angle outputted by the filter, so as to control the rotating machine with an output voltage of the DC-AC conversion circuit supplied thereto; and
   a setting unit that sets an object frequency to be variable so as to have an error frequency, determined by a difference between a frequency of a variable component in the current flowing through the rotating machine and an frequency of the excitation signal, to be within the cutoff region of the filter, the object frequency being at least either an excitation frequency of the excitation signal or a switching frequency of the switching element.

2. The control apparatus according to claim 1, wherein the error frequency is a difference between a frequency being the switching frequency multiplied by N, where N is an integer number which is two or more, and the frequency of the excitation signal.

3. The control apparatus according to claim 2, wherein
   the filter is a low pass filter;
   the error frequency is a difference between a frequency being the switching frequency multiplied by 2 and the frequency of the excitation signal; and
   the setting unit is configured to set the object frequency to be variable such that the error frequency is larger than or equal to the cutoff frequency of the low pass filter.

4. The control apparatus according to claim 3, wherein the object frequency is the switching frequency of the switching element.

5. The control apparatus according to claim 3, wherein the object frequency is a frequency of the excitation signal.

6. The control apparatus according to claim 3, wherein the setting unit sets the object frequency to be variable under a condition that the current flowing through the rotating machine exceeds a desired current.

7. The control apparatus according to claim 3, wherein the setting unit sets the object frequency to be variable under a condition that a rotational speed of the rotating machine is equal to or lower than a desired rotational speed.

8. The control apparatus according to claim 2, wherein the object frequency is the switching frequency of the switching element.

9. The control apparatus according to claim 2, wherein the object frequency is a frequency of the excitation signal.

10. The control apparatus according to claim 2, wherein the setting unit sets the object frequency to be variable under a condition that the current flowing through the rotating machine exceeds a desired current.

11. The control apparatus according to claim 2, wherein the setting unit sets the object frequency to be variable under a condition that a rotational speed of the rotating machine is equal to or lower than a desired rotational speed.

12. The control apparatus according to claim 1, wherein the object frequency is the switching frequency of the switching element.

13. The control apparatus according to claim 12, wherein
   the operating unit includes a synchronous PWM operating unit that controls the switching element to be ON and OFF based on a magnitude comparison between a carrier signal having a period where a period of the output voltage of the DC-AC conversion circuit is divided by an positive integer number and a command value of the output voltage; and
   a frequency of the carrier signal is set to be variable so as to set the switching frequency of the switching element to be variable.

14. The control apparatus according to claim 13, wherein the setting unit sets the object frequency to be variable under a condition that a rotational speed of the rotating machine is equal to or lower than a desired rotational speed.

15. The control apparatus according to claim 14, wherein the operating unit includes:
   a PWM operating unit that controls the switching element to be ON and OFF when the rotational speed is equal to or lower than the desired velocity; and
   an over modulation operating unit that controls the switching element to be ON and OFF when the rotational speed is equal to or higher than the desired velocity,
   the PWM operating unit controlling the switching element to be ON and OFF based on a magnitude comparison between a command value of the output voltage and a carrier signal so as to simulate a sine wave on the output voltage supplied to the rotating machine;

the over modulation operating unit controlling the switching element to be ON and OFF, under a condition that an amplitude of the command value is higher than one-half of an input voltage of the DC-AC conversion circuit, so as to control an amount of the output voltage to be sufficient with respect to the command value.

16. The control apparatus according to claim 1, wherein the object frequency is a frequency of the excitation signal.

17. The control apparatus according to claim 1, wherein the setting unit sets the object frequency to be variable under a condition that the current flowing through the rotating machine exceeds a desired current.

18. The control apparatus according to claim 1, wherein the setting unit sets the object frequency to be variable under a condition that a rotational speed of the rotating machine is equal to or lower than a desired rotational speed.

19. The control apparatus according to claim 1, wherein the object frequency is a frequency of the excitation signal, and the setting unit changes the frequency of the excitation signal at one of timings among a zero-cross timing of the excitation signal, a timing when the excitation signal becomes a maximum value and a timing when the excitation becomes a minimum value.

20. A control apparatus for controlling a rotating machine wherein a current flowing through the rotating machine is controlled by a DC-AC conversion circuit electrically connected thereto, the control apparatus comprising:

a signal output unit that outputs an excitation signal to a resolver used for detecting a rotational angle of the rotating machine, the resolver generating a modulated signal where the excitation signal is amplitude-modulated in response to the rotational angle of the rotating machine;

a demodulation unit that demodulates a signal related to the rotational angle based on a detection of the modulated signal and the excitation signal, and outputs a demodulated signal;

a filter that eliminates higher harmonics in the demodulated signal outputted by the demodulation unit so as to output a calculated angle of the rotational angle, the filter having a cutoff region determined by a cutoff frequency thereof; and an operating unit that controls a switching element included in the DC-AC conversion circuit to be ON and OFF based on the calculated angle of the rotational angle outputted by the filter, so as to control the rotating machine with an output voltage of the DC-AC conversion circuit supplied thereto, wherein an excitation frequency of the excitation signal and a switching frequency of the switching element are set such that an error frequency determined by a difference between a frequency of a variable component in the current flowing through the rotating machine and an frequency of the excitation signal, is within the cutoff region of the filter.

21. The control apparatus according to claim 20, wherein the error frequency is a difference between a frequency being the switching frequency multiplied by N, where N is an integer number which is two or more, and the frequency of the excitation signal.

22. The control apparatus according to claim 21, wherein the filter is a low pass filter;

the error frequency is a difference between a frequency being the switching frequency multiplied by 2 and the frequency of the excitation signal; and the setting unit is configured to set the object frequency to be variable such that the error frequency is larger than or equal to the cutoff frequency of the low pass filter.

* * * * *